United States Patent
Ogura (10) Patent No.: US 10,917,556 B2
(45) Date of Patent: Feb. 9, 2021

(54) IMAGING APPARATUS

(71) Applicant: Panasonic Intellectual Property Management Co., Ltd., Osaka (JP)

(72) Inventor: Motonori Ogura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/507,236

(22) Filed: Jul. 10, 2019

(65) Prior Publication Data

US 2020/0021745 A1 Jan. 16, 2020

(30) Foreign Application Priority Data

Jul. 11, 2018 (JP) ................................ 2018-131693

(51) Int. Cl.
*H04N 5/232* (2006.01)
*G06T 7/00* (2017.01)
*G06T 7/73* (2017.01)
*G06T 7/571* (2017.01)

(52) U.S. Cl.
CPC ....... *H04N 5/232125* (2018.08); *G06T 7/571* (2017.01); *G06T 7/74* (2017.01)

(58) Field of Classification Search
CPC ......... H04N 5/232125; H04N 5/23258; H04N 5/23212; H04N 5/23287; H04N 5/232; G06T 7/74; G06T 7/571; G01S 3/00
See application file for complete search history.

(56) References Cited

U.S. PATENT DOCUMENTS

| 2012/0154668 A1* | 6/2012 | Kimura | G02B 27/0075 348/348 |
| 2013/0308005 A1* | 11/2013 | Takahashi | G06K 9/6215 348/222.1 |
| 2014/0063234 A1 | 3/2014 | Nobayashi | |
| 2015/0109514 A1* | 4/2015 | Komatsu | H04N 5/2356 348/349 |

(Continued)

FOREIGN PATENT DOCUMENTS

| JP | 2011-015163 A | 1/2011 |
| JP | 2014-048459 A | 3/2014 |

(Continued)

*Primary Examiner* — Shahbaz Nazrul
(74) *Attorney, Agent, or Firm* — Renner, Otto, Boisselle & Sklar, LLP (57) ABSTRACT

An imaging apparatus includes: an image sensor capturing an image of a subject via an optical system including a focus lens, and generating image data; a distance measuring part calculating a subject distance and a movement distance of the subject by using the generated image data; and a controller that performs an auto-focus action by using the calculated subject distance or movement distance. The distance measuring part uses: first image data when the subject lies at the first position; second image data when the subject lies at the second position; and a PSF of the optical system corresponding to a focused position of the subject lying at the first position, thereby finding a distance between the first position and the second position, and calculating the subject distance and the movement distance of the subject for an image indicated by the second image data based on the found distance.

16 Claims, 10 Drawing Sheets

(56) References Cited

U.S. PATENT DOCUMENTS

| | | | | |
|---|---|---|---|---|
| 2015/0138429 A1* | 5/2015 | Ogura | ................ | H04N 5/23232 |
| | | | | 348/349 |
| 2015/0138430 A1* | 5/2015 | Ogura | ................ | H04N 5/23212 |
| | | | | 348/349 |
| 2015/0281552 A1* | 10/2015 | Ogura | ................ | H04N 5/23212 |
| | | | | 348/349 |
| 2015/0281553 A1* | 10/2015 | Ogura | ................ | H04N 5/23212 |
| | | | | 348/348 |
| 2015/0281554 A1* | 10/2015 | Ogura | ................ | H04N 5/23212 |
| | | | | 348/333.11 |
| 2016/0125611 A1 | 5/2016 | Komatsu | | |
| 2016/0212322 A1 | 7/2016 | Inoue | | |
| 2019/0004282 A1* | 1/2019 | Park | ........................ | G06T 7/248 |

FOREIGN PATENT DOCUMENTS

| | | |
|---|---|---|
| JP | 2015-121773 A | 7/2015 |
| JP | 2015-194671 A | 11/2015 |
| JP | 2015-194680 A | 11/2015 |
| JP | 2016-057633 A | 4/2016 |
| JP | 2016-090568 A | 5/2016 |
| JP | 2016-133595 A | 7/2016 |

\* cited by examiner

IMAGING APPARATUS

BACKGROUND

1. Technical Field

This disclosure relates to an imaging apparatus having an auto-focus (AF) function.

2. Related Art

JP 2011-15163 A discloses an imaging apparatus employing a depth from defocus (DFD) system. The imaging apparatus executes focus control so as to obtain plural types of blurs, to acquire a plurality of images of different blur sizes by use of imaging elements. The imaging apparatus next calculates a subject distance, based on the plural images of different blur sizes. The imaging apparatus then executes lens control, based on the calculated subject distance.

SUMMARY

This disclosure provides an imaging apparatus having an improved tracking ability in the auto-focus function.

An imaging apparatus of a first aspect of this disclosure includes: an image sensor that captures an image of a subject formed via an optical system including a focus lens, to generate image data; a distance measuring part configured to calculate a subject distance representing the distance to the subject and a movement distance of the subject by using the image data generated by the image sensor; and a controller configured to perform an auto-focus action by using the calculated subject distance or movement distance of the subject. The distance measuring part uses: first image data generated by the image sensor when the subject lies at a first position; second image data generated by the image sensor when the subject lies at a second position; and a point spread function of the optical system corresponding to a focused position of the subject lying at the first position, thereby finding a distance between the first position and the second position, and calculating the subject distance and the movement distance of the subject for an image indicated by the second image data based on the found distance.

An imaging apparatus of a second aspect of this disclosure includes an image sensor that captures an image of a subject formed via an optical system including a focus lens, to generate image data; a distance measuring part configured to calculate a subject distance representing the distance to the subject and a movement distance of the subject by using the image data generated by the image sensor; and a controller configured to perform an auto-focus action by using the calculated subject distance or movement distance of the subject. The distance measuring part uses: first image data generated by the image sensor when the subject lies at a first position; second image data generated by the image sensor when the subject lies at a second position; and an optical transfer function of the optical system corresponding to a focused position of the subject lying at the first position, thereby finding a distance between the first position and the second position, and calculating the subject distance and the movement distance of the subject for an image indicated by the second image data based on the found distance.

According to the imaging apparatus of this disclosure, the distance to the subject can be measured without moving the focus, based on the image blur status which is induced by the movement of the subject. For this reason, the distance to the subject can be measured rapidly, enabling the auto-focus function with an enhanced tracking ability for a moving subject to be implemented.

DETAILED DESCRIPTION OF EMBODIMENTS

Referring properly to the drawings, embodiments will now be described in detail. However, excessively detailed description may be omitted. For example, detailed description of already well-known matters or duplicate description of substantially the same configurations may be omitted. This is done for preventing the following description from becoming unnecessarily redundant and for facilitating understanding of those skilled in the art. The accompanying drawings and the following description are provided to allow those skilled in the art to fully understand this disclosure and it is not intended to thereby limit the subject matters described in the claims.

Embodiments of an imaging apparatus according to this disclosure will hereinbelow be described with reference to the drawings.

First Embodiment

A configuration and actions of an imaging apparatus in an embodiment of this disclosure will be described below.

[1. Configuration]

Figure 1:
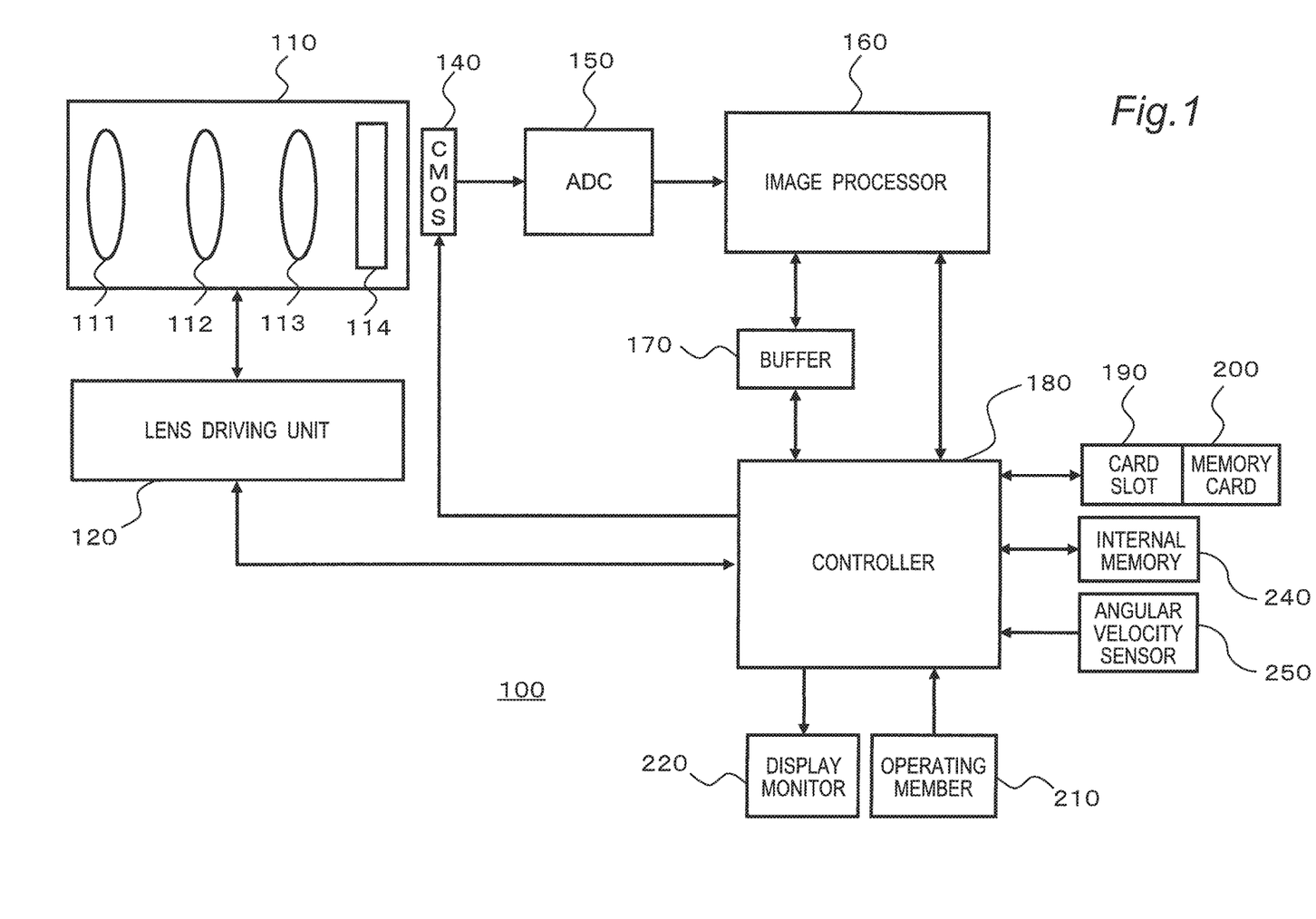
FIG. 1 is a block diagram showing a schematic configuration of a digital camera in a first embodiment.

FIG. 1 is a block diagram showing an electrical configuration of a digital camera 100 that is an imaging apparatus of the embodiment. The digital camera 100 includes an optical system 110 having one or more lenses. By light from a photographic subject, the optical system 110 forms a subject image on a CMOS image sensor 140 that is an image sensor. The formed subject image is captured by the CMOS image sensor 140. The CMOS image sensor 140 generates image data, based on the captured subject image. The image data generated ty the CMOS image sensor 140 is converted to a digital signal by an ADC (analog-digital converter) 150, and thereafter subjected to various processes in an image processor 160, for storage into a memory card 200. The configuration of the digital camera 100 will hereinafter be described in detail.

The optical system 110 in this embodiment includes a zoom lens 111, a camera-shake correction lens 112, a focus lens 113, and a diaphragm 114. The zoom lens 111 is moved along an optical axis of the optical system 110 so that the subject image can be zoomed in and out. The focus lens 113 is moved along the optical axis of the optical system 110 so that the focus can be adjusted. The camera-shake correction lens 112 is movable within a plane perpendicular to the optical axis of the optical system 110. The camera-shake correction lens 112 is moved in a direction to cancel the camera shake so that the influence of the digital camera 100 on the captured image can be reduced. The diaphragm 114 has an aperture located on the optical axis and adjusts the size of the aperture in accordance with the user's manual setting or automatically so as to regulate the amount of light traversing the diaphragm 114.

A lens driving unit 120 includes a zoom actuator driving the zoom lens 111, a camera-shake correction actuator driving the camera-shake correction lens 112, a focus actuator driving the focus lens 113, and a diaphragm actuator driving the diaphragm 114. The lens driving unit 120 is under control of a controller 180 to control each of the zoom actuator, focus actuator, and camera-shake correction actuator.

The CMOS image sensor 140 captures a subject image formed through the optical system 110 and generates analog image data that is an analog signal. The CMOS image sensor 140 performs various actions such as exposure, transfer, and electronic shutter.

The ADC 150 converts the analog image data generated by the CMOS image sensor 140 to digital image data that is a digital signal.

The image processor 160 applies various signal processes to the image data generated by the CMOS image sensor 140 and converted to the digital signal, to generate image data for display on a display monitor 220 or generate image data for storage into the memory card 200. For example, the image processor 160 performs signal processes such as gamma correction, white balance correction, and scratch correction for the image data generated by the CMOS image sensor 140. The image processor 160 compresses image data generated by the CMOS image sensor 140 by using e.g. a compression format compliant with the H.264 standard or MPEG2 standard. The image processor 160 can be implemented by a semiconductor element, etc. The functions of the image processor 160 may be achieved by cooperation of hardware and software (an application program) or may be achieved by only a hardware circuit designed specifically to achieve a predetermined function. That is, the image processor 160 may be configured from not only a CPU or MPU but also from a DSP, FPGA, ASIC, microcomputer, etc.

The controller 180 controls the entire digital camera 100. The controller 180 can be implemented by the semiconductor element, etc. The functions of the controller 180 may be achieved by cooperation of hardware and software (an application program) or may be achieved by only a hardware circuit designed specifically to achieve a predetermined function. That is, the controller 180 may be configured from not only the CPU or MPU but also from the DSP, FPGA, ASIC, microcomputer, etc.

A buffer 170 functions as a work memory of the image processor 160 and the controller 180. The buffer 170 may be implemented e.g. by a DRAM or a ferroelectric memory.

A card slot 190 holds the memory card 200 removably. The card slot 190 is connectable mechanically and electrically to the memory card 200. The memory card 200 includes in its interior a flash memory or the ferroelectric memory for example so that it can store data such as an image file generated by the image processor 160.

An internal memory 240 is configured from the flash memory or the ferroelectric memory for example. The internal memory 240 stores e.g. a control program for controlling the entire digital camera 100. The internal memory 240 stores the PSF required for the DFD operation. The details of the PSF will be described in detail later.

An operating member 210 is a general term of user interfaces that accept user operations. The operating member 210 includes for example a release button by which the user gives a focusing instruction, a record button, a cross-key that accepts a user operation, an OK button, or/and a touch panel.

A display monitor 220 has a screen that displays an image indicated by image data generated by the CMOS image sensor 140 and an image indicated by image data read from the memory card 200. The display monitor 220 can further display on its screen various menu screens, etc. for various settings of the digital camera 100. The touch panel is disposed on the screen of the display monitor 220. The touch panel is one element of the operating member that can be touched by the user to accept various touch operations. The control 180 is notified of an instruction indicated by a touch operation on the touch panel, to perform various processes.

An angular velocity sensor 250 detects an angular velocity occurring in the digital camera 100 due to a camera shape, etc. The angular velocity sensor 250 is a gyrosensor for example. The controller 180 is notified of an angular velocity detected by the angular velocity sensor 250. By the angular velocity notified from the angular velocity sensor 250, the controller 180 can drive the camera-shake correction lens 112 so as to cancel an image shake arising from the angular velocity occurring in the digital camera 100.

[2. Action]

The digital camera 100 performs the auto-focus action using a DFD operation result. In particular, without moving the focus lens 113, the digital camera 100 calculates a subject distance of a post-movement subject, based on the image blur status which is induced by the movement of the subject, to perform the auto-focus action.

Although, strictly speaking, the subject distance is a distance to the subject from a principal point of the optical system 110, it is assumed for ease of explanation that the focal length and F-number in the optical system 110 are fixed whereas a change of the principal point of the optical system 110 depends on a change of a position L of the focus lens 113. Hereinafter, referring to FIG. 2, a principle will be described by which the subject distance is calculated based on a change of the image blur status caused by the movement of the subject.

Figure 2:
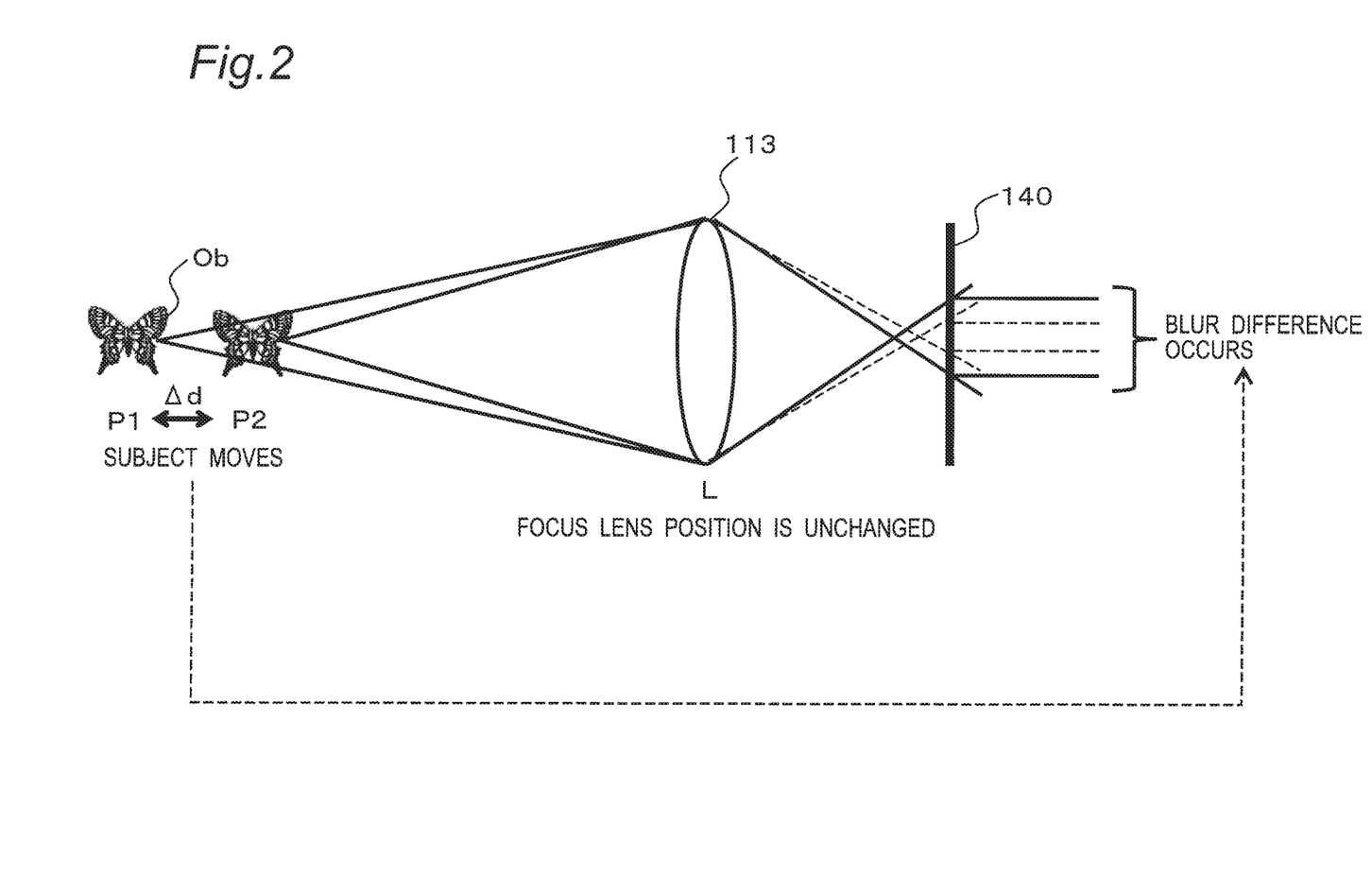
FIG. 2 is a view explaining a principle of the distance measurement by a DFD operation utilizing a movement of a subject.

FIG. 2 is a view explaining a principle of the distance measurement by the DFD operation utilizing a subject movement. In FIG. 2, with the focus lens 113 lying at a position L, there occurs a difference of the blur status in images generated by the CMOS image sensor 140 between the case where a subject Ob lies at a position P1 and the case where the subject Ob lies at a position P2 apart by Δd from the position P1. In this embodiment, the DFD operation is performed to find the distance Δd between the position P1 and the position P2, based on the difference of the blur status. In the case where either a subject distance D1 when the subject Ob is at the position P1 or a subject distance D2 when the subject Ob is at the position P2 is known, an unknown subject distance can be found from the known subject distance and the distance Δd.

Figure 3:
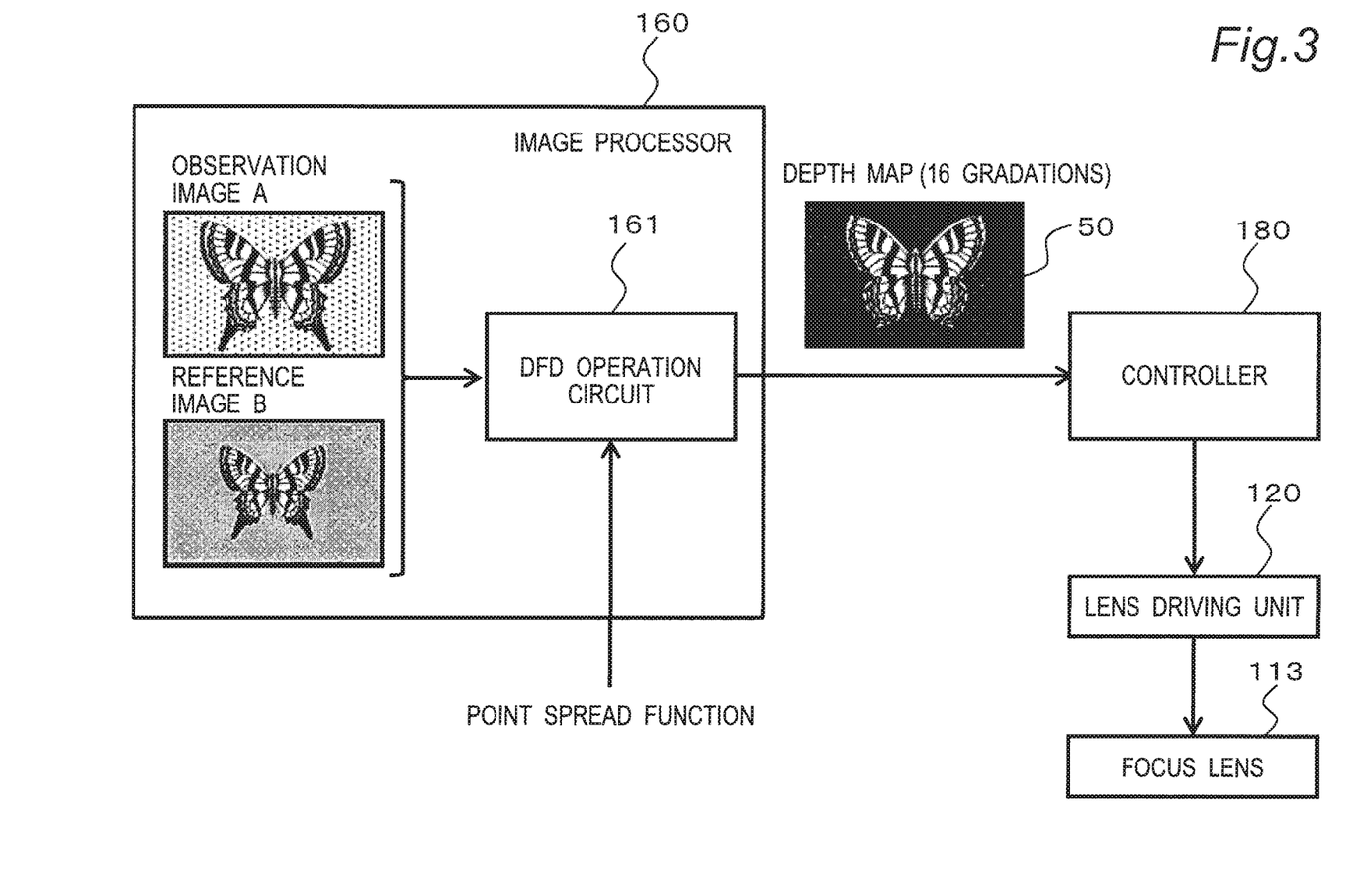
FIG. 3 is a block diagram showing a schematic configuration of an image processor in the first embodiment.

FIG. 3 is a view for explaining an overview of focus lens control that uses a DFD operation result of the digital camera 100 in the first embodiment.

The image processor 160 includes a DFD operation circuit 161. The DFD operation circuit 161 carries out the DFD operation to create a depth map 50. The depth map 50 is an image that contains, on a pixel to pixel basis, information indicative of a subject movement distance indicated by a pixel. From an observation image A and a reference image B that are two images having different blur amounts generated by a subject movement and from the point spread function, the DFD operation circuit 161 finds, for each pixel, a distance (subject movement distance) between a subject position in the observation image A and a subject position in the reference image B. The depth map 50 is thus created.

The DFD operation circuit 161 next notifies the controller 180 of the created depth map 50. Based on the notified depth map 50, the controller 180 calculates a subject distance for the observation image A and, based on the calculated subject distance, controls the lens driving unit 120 so as to move the focus lens 113 to a focused position.

[2-1. Calculation of Subject Movement Distance Using DFD Operation Result]

Detailed description will hereinbelow be given of a DFD operation by the DFD operation circuit 161 shown in FIG. 3 and of a subject movement distance calculation process effected by the controller 180.

The DFD operation by the DFD operation circuit 161 will first be described.

Figure 4:
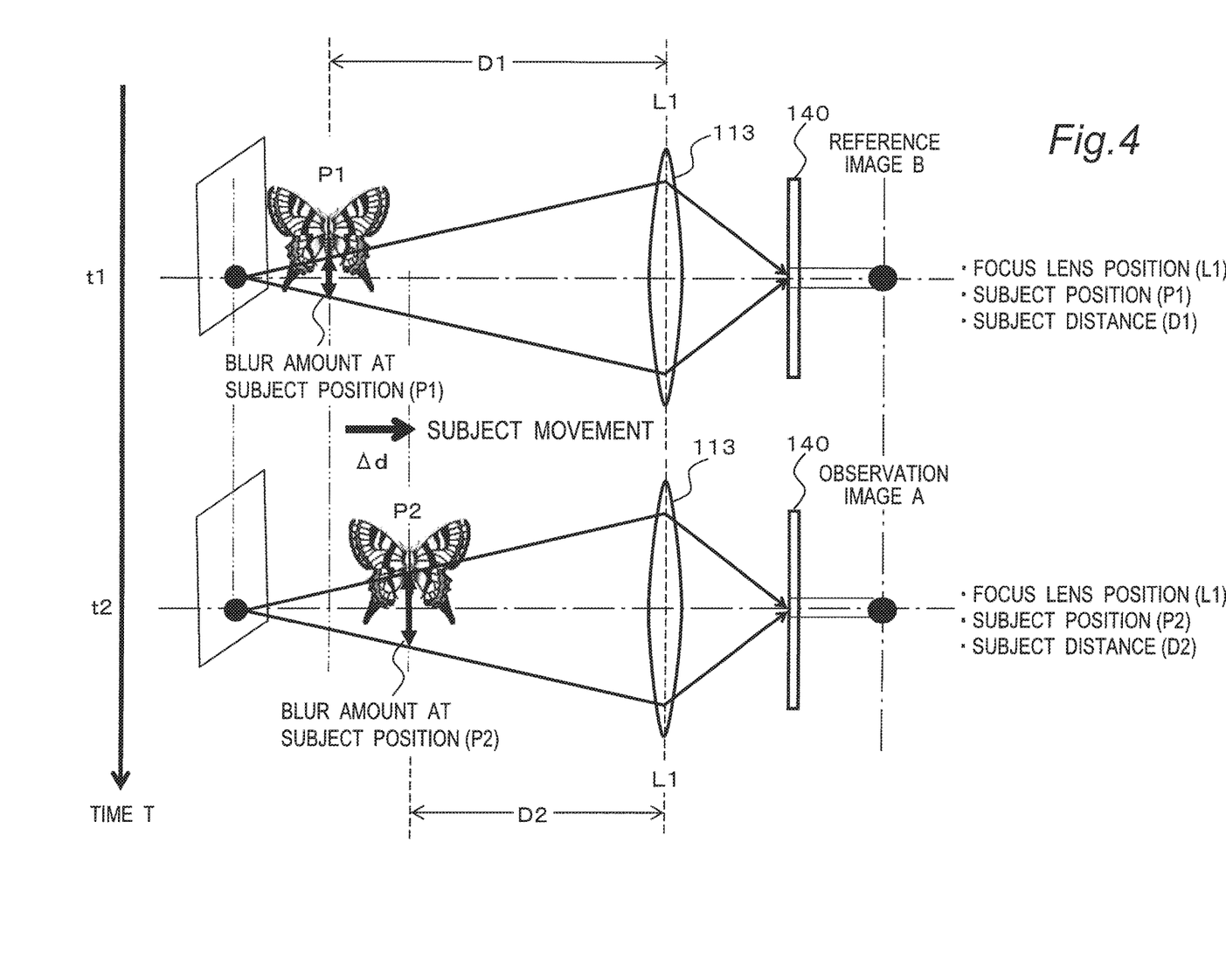
FIG. 4 is a view for explaining a method of calculating the movement distance of a subject of the digital camera in the first embodiment.

FIG. 4 is an image view for explaining the movement of the focus lens 113 in the DFD operation of the digital camera 100 of the embodiment. Used in this DFD operation are two images having different blur amounts, created by the movement of a subject. Specifically, as shown in FIG. 4, at a time t1, the controller 180 allows the CMOS image sensor 140 to capture a subject lying at a position P1 when the focus lens 113 is located at a position L1, to create a captured image. Let this captured image be the reference image B. Assume that, afterward, at a time t2, the subject moves to a position P2. At the time t2, the CMOS image sensor 140 captures the subject after movement at the same lens position L1, to create a captured image. Let this captured image be the observation image A. Although the reference image B and the observation image A are captured at the same focus lens 113 position, they have blur amounts different from each other due to different subject positions, in spite of captured images of the same subject.

Figure 5:
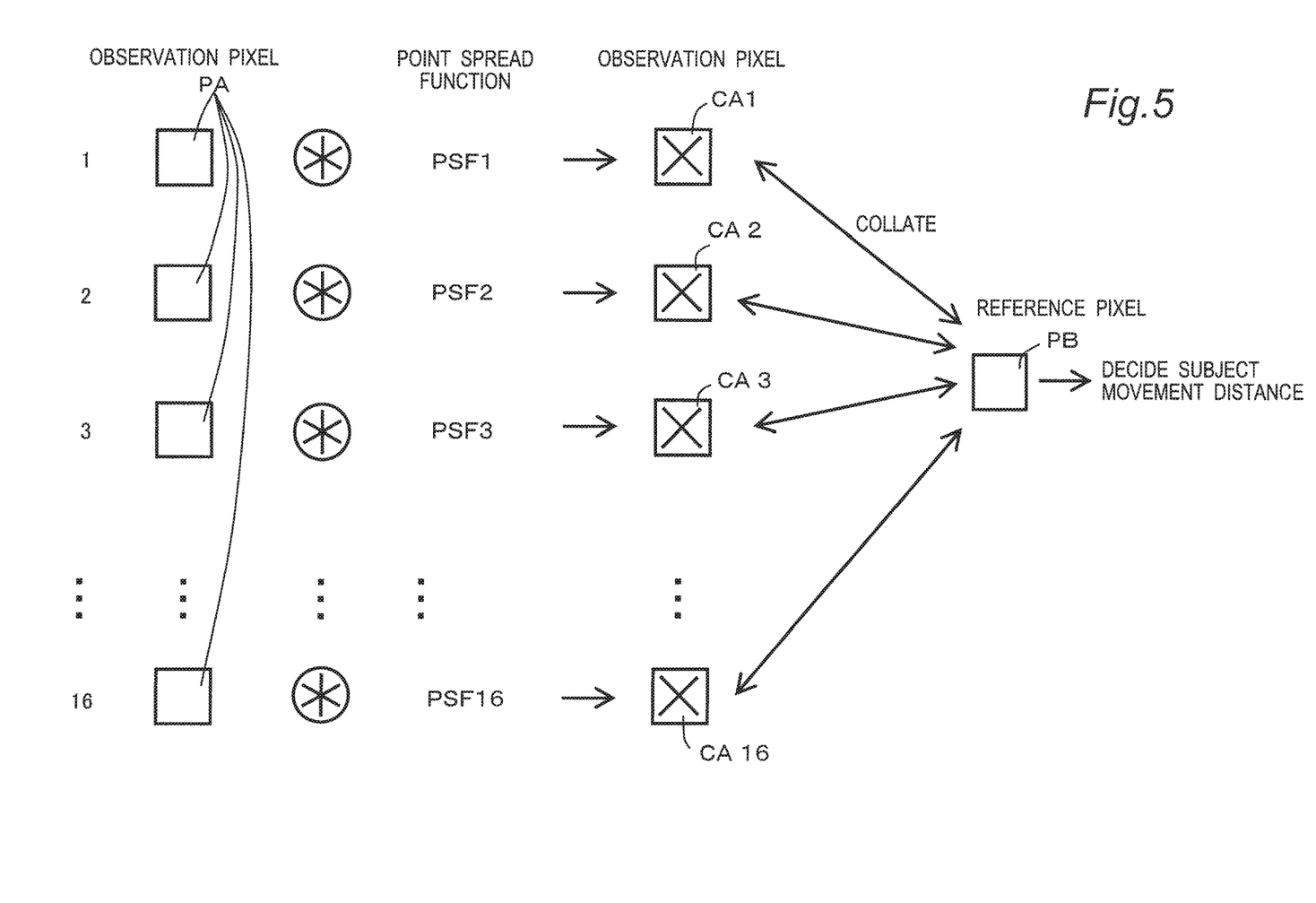
FIG. 5 is a view for explaining the DFD operation of the digital camera in the first embodiment.

FIG. 5 is a view for explaining a method of calculating the movement distance of a subject by the DFD operation of the digital camera 100 in this embodiment.

The DFD operation circuit 161 applies the DFD operation to observation pixels PA making up the observation image A and to reference pixels PB making up the reference image B and calculates the subject movement distance for each of the observation pixels PA, to create the depth map 50. The DFD operation circuit 161 collates a plurality of observation pixels CA that are results obtained by convoluting a plurality of point spread functions into the observation pixels PA with reference pixels PB lying at the same coordinates as image coordinates of the observation pixels CA.

The point spread function will be described herein. The point spread function refers to a function indicative of response to a point light source of an optical system and indicates change in the blur amount. By convoluting the point spread function into an image corresponding to a set of point light sources, blurred images can be generated in an artificial manner. The point spread function is a function different for each optical system and, for example, it differs for each interchangeable lens. Furthermore, even with the same interchangeable lens, difference occurs depending on the focal length, F-number, focus position, etc. The internal memory 240 stores a plurality of point spread functions in advance.

Figure 6:
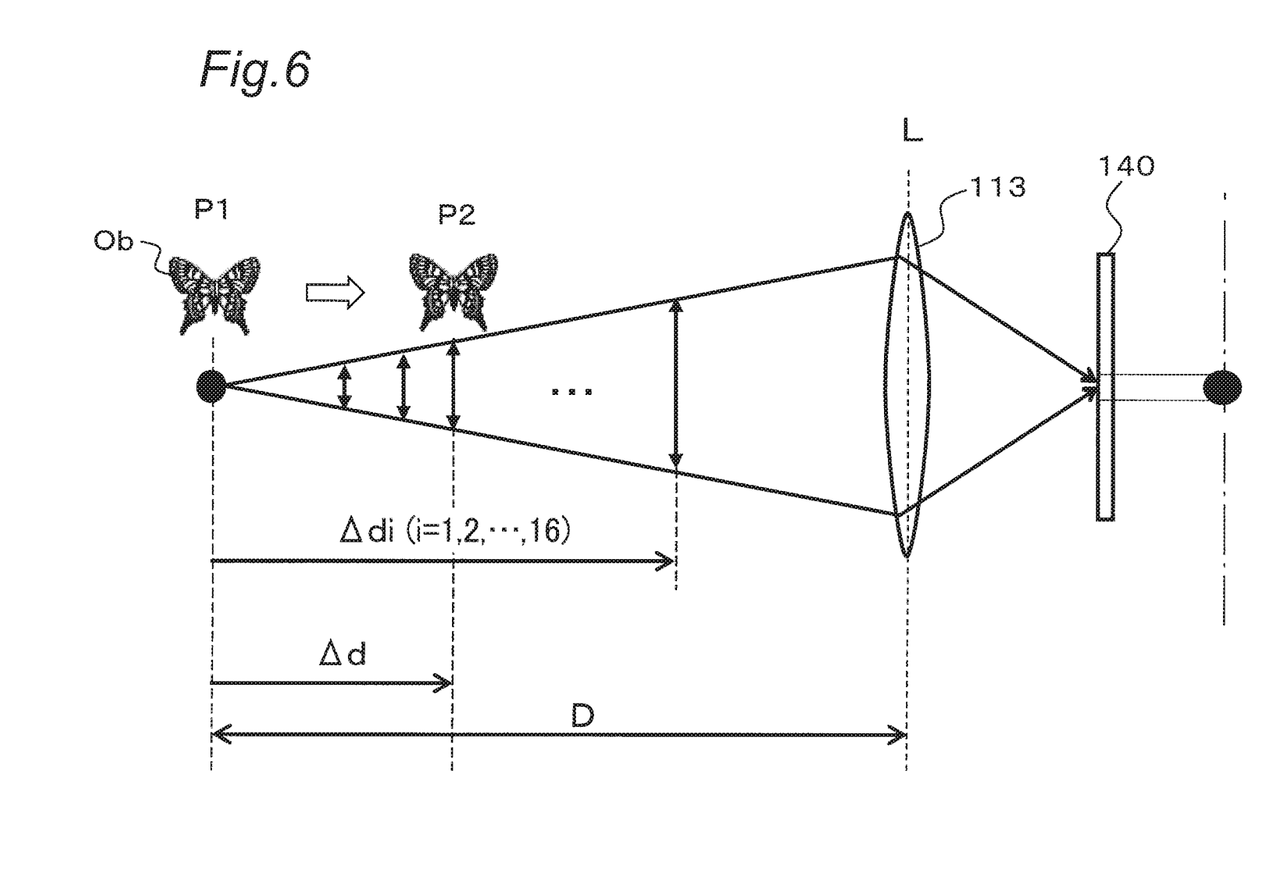
FIG. 6 is a view for explaining a point spread function (PSF) in the first embodiment.

FIG. 6 is a view for explaining the point spread function (PSF) used in this embodiment. In the state as shown in FIG. 6 where at a focus lens position L focusing is made on a subject Ob at a subject distance D, the point spread function (PSF) of this embodiment is defined to give the blur amount of the subject Ob lying at a position apart by a movement distance Δd from the subject Ob. Herein, the point spread function (PSF) is set for combinations of a plurality of lens positions L and subject distances D. Furthermore, for each of the combinations of the lens positions L and subject distances D, 16 point spread functions PSF1 to PSF16 are set for 16 movement distances Δd1 to Δd16. The movement distances Δd1 to Δd16 are so set as to contain positive and negative values like . . . , −30, −20, −10, +10, +20, +30, . . . . By setting the positive and negative values in this manner, the direction of movement of the subject Ob on the optical axis is known. As described above, a plurality of point spread functions PSF are set on the basis of the lens positions L, subject distances D, and the movement distances Δd.

Based on the combinations of the lens positions L and subject distances D, the controller 180 reads the point spread functions PSF1 to PSF16 from the internal memory 240 and notifies the DFD operation circuit 161 of the read point spread functions PSF1 to PSF16.

Figure 7:
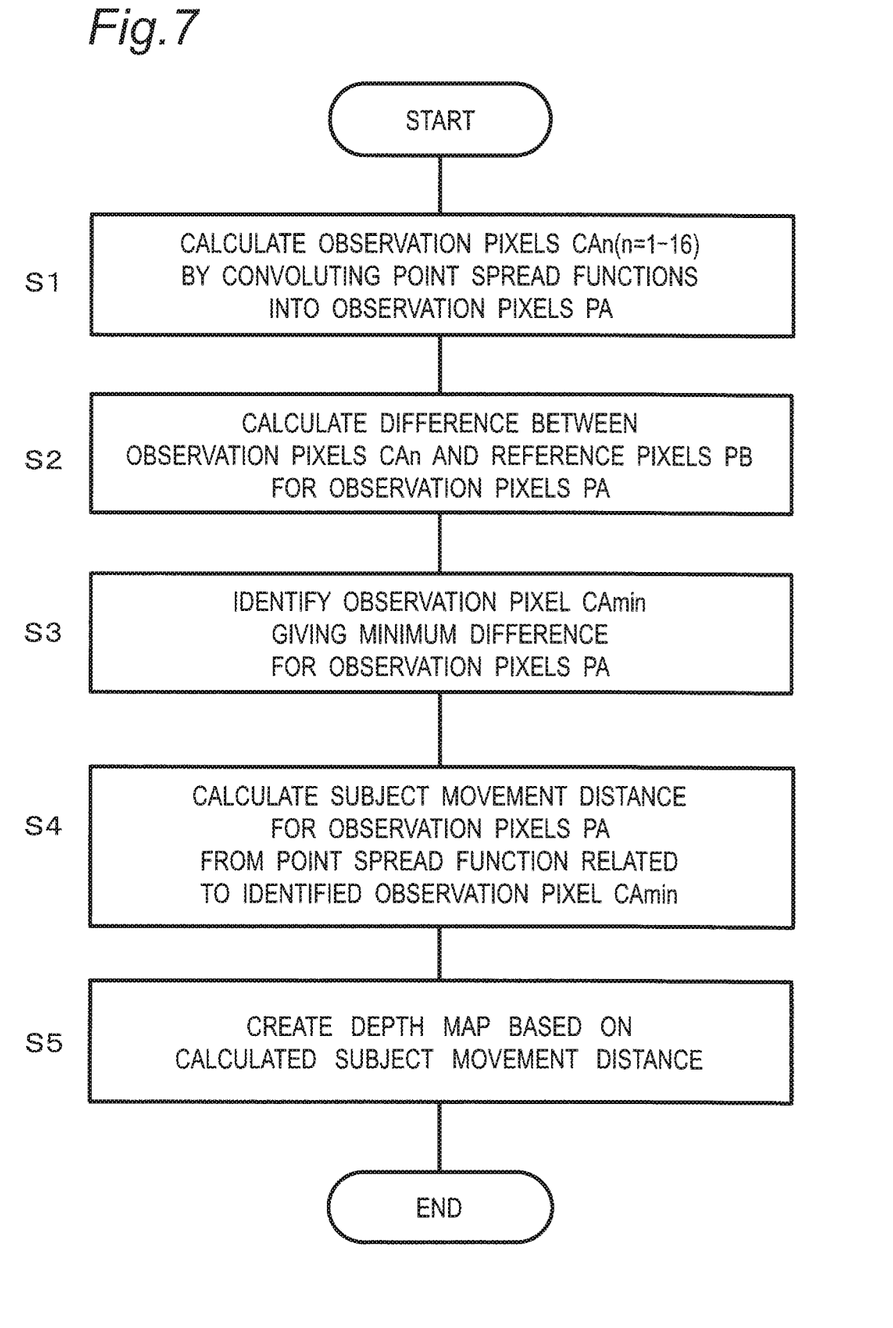
FIG. 7 is a flowchart showing a Depth map creation action by the DFD operation in the first embodiment.

FIG. 7 is a flowchart showing a creation process of the depth map 50 effected by the DFD operation circuit 161 in the image processor 160. Hereinafter, referring to FIGS. 4 to 7, a creation action of the depth map 50 effected by the DFD operation circuit 161 will be described.

The DFD operation circuit 161 convolutes 16 point spread functions PSF1 to PSF16 into the observation pixels PA, to thereby create 16 observation pixels CA1 to CA16 corresponding to movement distances of a subject in the observation pixels PA (S1). To this end, based on the subject distance D1 and the focus lens position L1 of the reference image B, the DFD operation circuit 161 reads the 16 point spread functions PSF1 to PSF16 each having a different movement distance Δd from the internal memory 240 and performs convolution into the observation pixels PA using the read point spread functions PSF1 to PSF16.

The 16 observation pixels CA1 to CA16 form their respective different blurred images because the point spread functions used for the convolution operation are each different. Each of the observation pixels CA1 to CA16 after convolution operation indicates a blurred status of each pixel PA that is observed when a subject moves by movement distances Δd1 to Δd16 in the direction of the optical axis from a position at which the observation pixel PA is shot.

Subsequently, for the observation pixels PA, the DFD operation circuit 161 compares the observation pixels CA1 to CA16 with the reference pixels PB, respectively, to calculate the degree of similarity therebetween (S2). The DFD operation circuit 161 identifies an observation pixel CAmin whose degree of similarity to the reference pixel PB is maximum, among the observation pixels CA1 to CA16 (S3). The DFD operation circuit 161 then decides a movement distance Δdmin corresponding to the point spread function PSF convoluted in the identified observation pixel CAmin, as the movement distance of the observation pixel PA (S4). The thus decided movement distance is a subject movement distance from a subject position P1 lying at the reference pixel PB when the reference image B is captured and to a subject position P2 lying at the observation pixel PA when the observation image A is captured.

For example, in the case where the degree of similarity between the observation pixel CA3 and the reference pixel PB is maximum among the degrees of similarity between the observation pixels CA1 to CA16 and the reference pixels PB, the DFD operation circuit 161 decides a movement distance $\Delta d3$ corresponding to a point spread function PSF3 convoluted in the observation pixel PA when creating the observation pixel CA3, as a subject movement distance of the observation pixel PA. The DFD operation circuit 161 then outputs distance information indicative of the subject movement distance.

Using results of execution of the above actions for the pixels of the observation image A, the DFD operation circuit 161 creates the depth map 50 that represents a distribution of the subject movement distance for the pixels PA of the observation image A (S5). Since this embodiment uses 16 point spread functions corresponding to the subject movement distances, the subject movement distance in the depth map 50 is expressed in 16 gradations. Each pixel of the thus created depth map 50 indicates the movement distance of a subject from the subject position at the time of the most-recent focusing.

[2-2. Auto-Focus Action]

Figure 8:
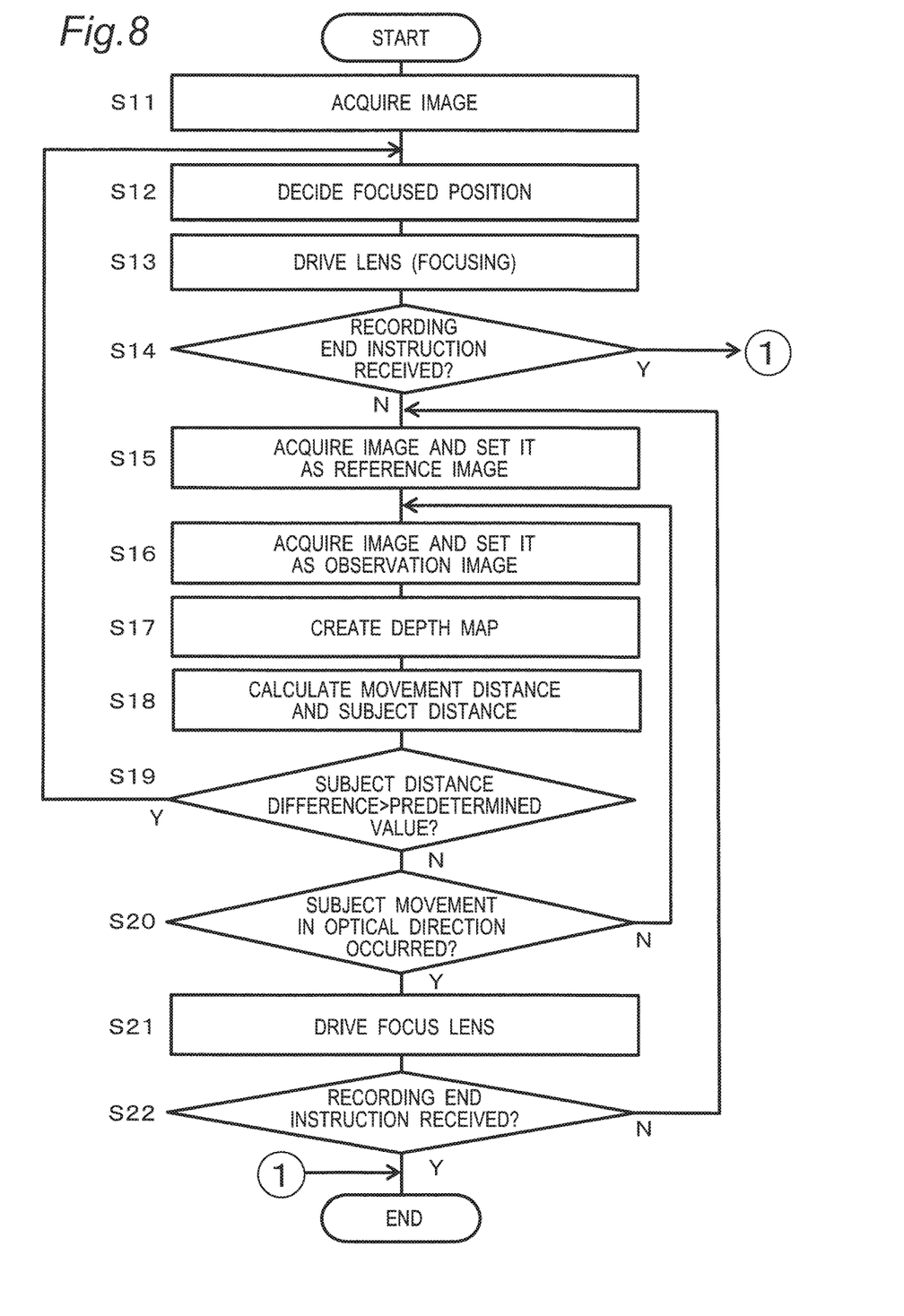
FIG. 8 is a flowchart showing an auto-focus action during video recording of the digital camera in the first embodiment.

FIG. 8 is a flowchart showing an auto-focus action of the digital camera 100 during video recording. Referring to FIG. 8, the auto-focus action of the digital camera 100 during the video recording will be described. The processing of the flowchart of FIG. 8 starts when detecting a recording start instruction from the user. The recording start instruction from the user is given e.g. by an operation of pressing down a record button.

In response to the recording start instruction, the controller 180 acquires image data of an image captured by the CMOS image sensor 140 (S11). Based on the image data, the controller 180 then finds a focused position of the focus lens (S12) and performs a focusing action to move the focus lens 113 to its focused position (S13). The method of finding the focused position herein may be the DFD system or may be a contrast AF system. In preparation for the subsequent DFD operation, the subject distance upon focusing and data of the image captured upon focusing are stored in the internal memory 240.

Afterward, the controller 180 determines whether a recording end instruction has been received from the user (S14). The recording end instruction is given e.g. by an operation of pressing down the record button again. If the recording end instruction has been received (YES at S14), this processing comes to an end.

If the recording end instruction has not been received (NO at S14), the controller 180 acquires image data from the CMOS image sensor 140 and sets an image indicated by the image data as the reference image B (S15). The image data set as the reference image B is recorded in the internal memory 240.

The controller 180 further acquires next image data from the CMOS image sensor 140 and sets an image indicated by the image data as the observation image A (S16). The image data set as the observation image A is recorded in the internal memory 240.

The controller 180 then instructs the image processor 160 to create the depth map 50 (S17). The image processor 160 creates the depth map 50 in accordance with the instruction of the controller 180. Specifically, the image processor 160 reads the image data of the reference image B and the image data of the observation image A from the internal memory 240, to create the depth map 50 in accordance with the flowchart shown in FIG. 6.

Using the depth map 50, the controller 180 calculates the movement distance ($\Delta d$) and the subject distance for the subject after movement (S18). Specifically, the controller 180 first refers to the depth map 50 to find the movement distance ($\Delta d$) for a predetermined subject (or region). Here, the predetermined subject may be one manually specified by the user or may be one (a face for example) automatically detected. The controller 180 reads a most-recent subject distance (Dold) from the internal memory 240. The controller 180 figures out a subject distance (Dnew) after movement from the read most-recent subject distance (Dold) and the current movement distance ($\Delta d$) found from the depth map 50, using the following expression $$Dnew=Dold+\Delta d$$

The controller 180 compares the current subject distance (Dnew) found in this manner with the most-recent subject distance (Dold) to determine a distance difference therebetween (S19). If the distance difference is greater than a predetermined value (YES at S19), the controller 180 returns to step S12 to again perform the focusing action. In this case, due to a high possibility of a great movement of the subject, the second focusing action is performed to obtain a higher detection accuracy of the subject distance.

If the subject distance difference is equal to or less than the predetermined value (NO at S19), the controller 180 determines whether a movement of the subject in the optical direction has occurred (S20). It is determined for example that a movement of the subject in the optical direction has occurred if the movement distance ($\Delta d$) is equal to or greater than a determination value.

If no movement of the subject in the optical direction has occurred (NO at S20), the controller 180 returns to step S16, to again acquire the observation image to repeat the above processes. This is because there is no need to move the focus lens due to no movement of the subject.

If a movement of the subject in the optical direction has occurred (YES at S20), the controller 180 controls the lens driving unit 120 to allow the focus lens 113 to move by a distance corresponding to the movement distance ($\Delta d$), for movement to the focused position (S21). This enables the focus lens 113 to automatically be focused on the moved subject. The subject distance upon focusing is stored in the internal memory 240, for use as the subject distance (Dold) at the time of next DFD operation.

Till acceptance of the recording end instruction, the controller 180 repeats the above processes (S12 to S22).

Figure 9:
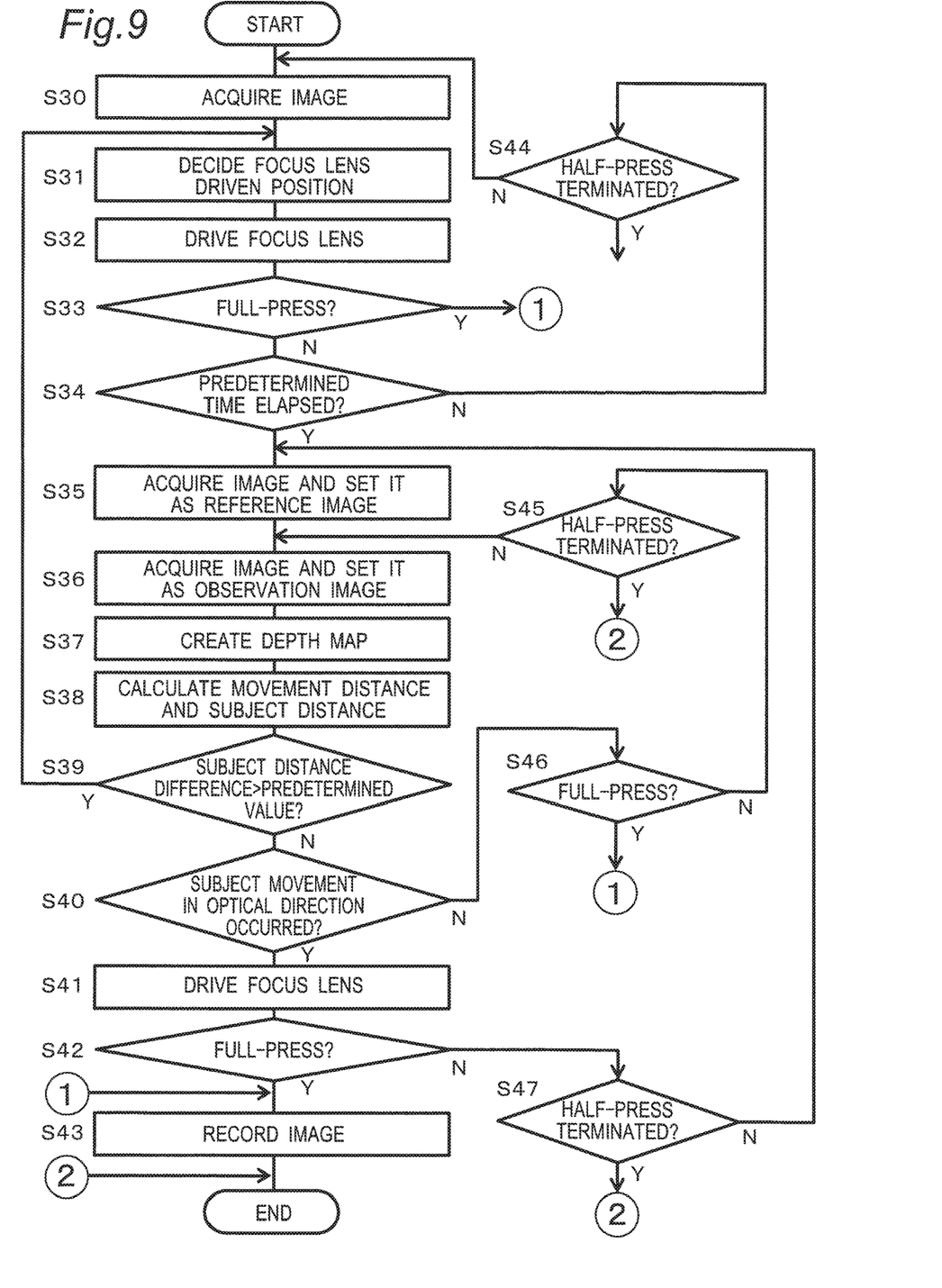
FIG. 9 is a flowchart showing the auto-focus action during still image recording of the digital camera in the first embodiment.

FIG. 9 is a flowchart showing an auto-focus action during still image recording of the digital camera. The auto-focus action during the still image recording of the digital camera will be described with reference to FIG. 9. The processing shown in the flowchart of FIG. 9 starts when a half-press operation of the release button is detected.

The controller 180 first acquires image data of an image captured by the CMOS image sensor 140 (S30). Based on the image data, the controller 180 then decides a driven position (focused position) of the focus lens (S31) and drives the focus lens to the decided driven position (S32). The controller 180 decides the focus lens driven position using the DFD system or the contrast AF system for example. In preparation for the subsequent DFD operation, the subject distance at that time and the captured image data are stored in the internal memory 240.

Subsequently, the controller 180 determines whether or not the release button has been fully pressed (S33). Since a full-press operation of the release button is an operation to instruct capturing and recording of an image, if the release button has been fully pressed (YES at S33), the controller 180 acquires image data of an image captured by the CMOS image sensor 140 and subjects it to predetermined image processing, for the subsequent recording into the memory card 200 (S42). After the completion of recording of the image data, this processing terminates.

If the release button has not fully pressed (NO at S33), the controller 180 determines whether or not a predetermined time has elapsed from beginning of the half-press state (S34). Till the lapse of the predetermined time from beginning of the half-press state (NO at S34), the controller 180 returns to step S30 to repeat the above processes (S30 to S33). For this duration, if the half-press of the release button has terminated (YES at S44), this processing comes to an end.

If the predetermined time has elapsed after beginning of the half-press state (YES at S44), the controller 180 acquires image data of an image captured by the CMOS image sensor 140 and sets the acquired image data as the reference image B (S35). The image data set as the reference image B is recorded in the internal memory 240.

Furthermore, the controller 180 acquires image data of another image captured by the CMOS image sensor 140 and sets the acquired image data as the observation image A (S36). The image data set as the observation image A is recorded in the internal memory 240.

The controller 180 then instructs the image processor 160 to create the depth map 50 (S37). The creation process of the depth map 50 is as described hereinabove.

Using the depth map 50, the controller 180 calculates the movement distance ($\Delta d$) and the subject distance of the subject after movement (S38).

The controller 180 compares the calculated current subject distance (Dnew) and the most-recent subject distance (Dold) to determine the distance difference therebetween (S39). If the distance difference is greater than a predetermined value (YES at S39), the controller 180 returns to step S31 to again perform the focusing action. In this case, due to a high possibility of a great movement of the subject, the second focusing action is performed to obtain a higher detection accuracy of the subject distance.

If the distance difference is not greater than the predetermined value (NO at S39), the controller 180 determines whether or not a movement of the subject in the optical axis direction has occurred (S40).

If the movement of the subject in the optical direction has not occurred (NO at S40), the controller 180 goes back to step 36. At that time, the controller 180 detects whether the release button has been fully pressed (S46) or whether the half-press of the release button has been terminated (S45).

If the release button has been fully pressed (YES at S46), the controller 180 acquires image data of another image captured by the CMOS image sensor 140 and applies predetermined image processing thereto, to thereafter record it into the memory card 200 (S43) to end this processing. If the half-press of the release button has been terminated (YES at S45), the controller 180 brings this processing to an end.

On the contrary, if a movement of the subject in the optical direction has occurred (YES at S40), the controller 180 controls the lens driving unit 120 to allow the focus lens 113 to move by a distance corresponding to the movement distance ($\Delta d$), for movement to a focused position (S41). This enables the focus lens 113 to be automatically focused on the moved subject (S41). The subject distance upon focusing is stored in the internal memory 240 and is used as the subject distance (Dold) at the time of the next DFD operation.

Subsequently, the controller 180 detects whether the release button has been fully pressed (S42). If the full-press of the release button has been detected (YES at S42), the controller 180 records the image data into the memory card 200 (S43), to end this processing.

If the full-press of the release button has not been detected (NO at S42), the controller 180 returns to step S35, to repeat the above processes. For this duration, when the termination of the half-press of the release button or the full-press of the release button has been detected, the controller 180 executes the above processes, to end this processing.

As described above, also in the case of the still image recording, a rapid focusing action can be achieved due to the execution of the focusing action by the DFD system. This is advantageous in the case e.g. where an image of an athletics sprinter at the start is desired to be shot. In this case, the photographer keeps the release button half-pressed immediately before the start, to wait for the start while focusing on a desired player in advance, and fully presses the release button the instant the player starts, to take a photo. According to the digital camera 100 of this embodiment, even in such a situation, a clear image without blurring can be captured due to the execution of the high-speed focusing action.

[3. Effect, Etc.]

As set forth hereinabove, the digital camera 100 (an example of the imaging apparatus) of this embodiment includes: the CMOS image sensor 140 (an example of the image sensor) that captures an image of a subject formed through the optical system 110 including the focus lens 113, to generate image data; the image processor 160 (or the DFD operation circuit 161) (an example of the distance measuring part) that uses the image data generated by the CMOS image sensor 140, to calculate a subject distance (d) representing the distance to the subject and a movement distance ($\Delta d$) of the subject; and the controller 180 (an example of the controller) that uses the calculated subject distance or movement distance ($\Delta d$) of the subject, to perform an auto-focus action. The image processor 160 uses: the reference image B (an example of an image indicated by the first image data) generated by the CMOS image sensor 140 when the subject lies at a first position (P1); the observation image A (an example of an image indicated by the second image data) generated by the CMOS image sensor 140 at the same focus lens position and when the subject lies at a second position (P2); and the point spread function (PSF1 to PSF16) for the optical system 110 corresponding to a focused position (L1) of the subject lying at the first position (P1), to find a distance ($\Delta d$) between the first position (P1) and the second position (P2). Based on the resultant distance ($\Delta d$), the image processor 160 calculates the subject distance (D) and the movement distance ($\Delta d$) of the subject for the observation image A.

By virtue of the above configuration, the digital camera 100 can measure the distance to a subject after movement without moving the focus lens 113, by utilizing the blur difference induced by a movement of the subject when the subject moves. The resultant rapid measurement of the subject distance can enhance the tracking ability for a moving subject in the auto-focus action. This is effective for the video shooting or high-speed continuous shooting in particular.

Second Embodiment

In the first embodiment, the point spread function (PSF) was used in the DFD operation. In the DFD operation, this point spread function (PSF) may be replaced by the optical transfer function (OTF) that is obtained by Fourier transforming the point spread function. In this embodiment, description will be given of the digital camera 100 performing the DFD operation that uses the optical transfer function (OTF). The digital camera 100 of this embodiment has a similar configuration to that of the first embodiment except that the DFD operation using the optical transfer function (OTF) is carried out, and performs similar actions thereto.

Figure 10:
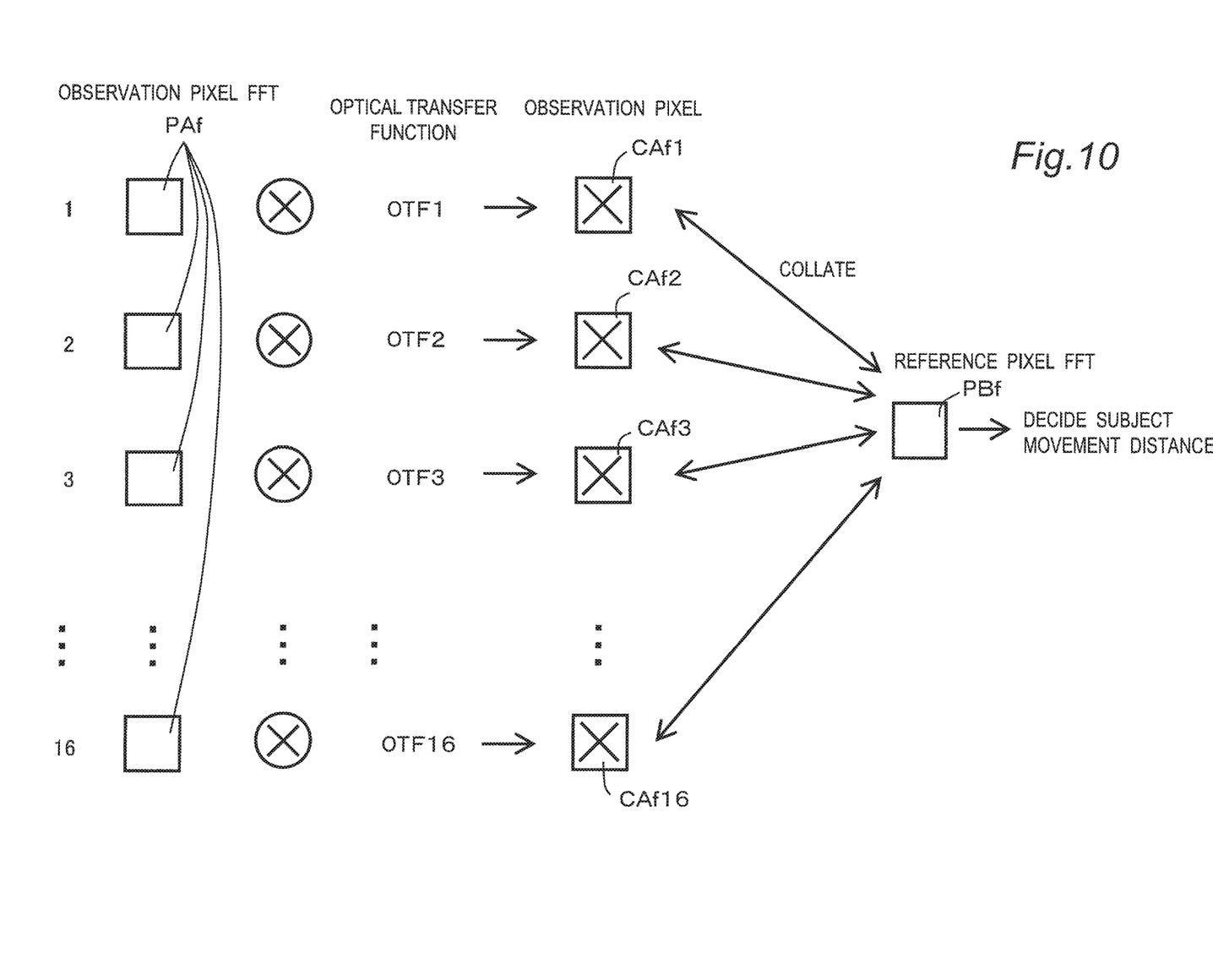
FIG. 10 is a view for explaining the DFD operation using an optical transfer function (OTF) in place of the PSF, in a second embodiment.

FIG. 10 is a view for explaining a method of calculating the movement distance of a subject by the DFD operation in the digital camera 100 of this embodiment. Optical transfer functions OTF1 to OTF16 are functions that are obtained by fast Fourier transforming point spread functions PSF1 to PSF 16, respectively.

The DFD operation circuit 161 subjects the observation image A to FFT processing to obtain an observation image Af. The observation image Af is made up of a plurality of observation pixels PAf. The DFD operation circuit 161 subjects the reference image B to the FFT processing to obtain a reference image Bf. The reference image Bf is made up of a plurality of reference pixels PBf.

The DFD operation circuit 161 applies the DFD operation to the observation pixels PAf making up the observation image Af and to the reference pixels PBf making up the reference image Bf, to calculate a movement distance of a subject for each observation pixel PA to create the depth map 50.

Specifically, the DFD operation circuit 161 allows the optical transfer functions OTF1 to OTF16 to act on the observation pixels PAf, to obtain observation pixels CAf1 to CAf16. The DFD operation circuit 161 collates the obtained observation pixels CAf1 to CAf16 with the reference pixels PBf lying at the same coordinates as image coordinates of the observation pixels CAf1 to CAf16. The DFD operation circuit 161 then identifies an observation pixel CAfmin whose degree of similarity of the amplitude component is highest. The DFD operation circuit 161 then decides a movement distance corresponding to the optical transfer function OTF by which the identified observation pixel CAf is created, as the movement distance of the observation pixel PAf, i.e. the movement distance of the observation pixel PA.

Thus, the optical transfer function (OTF) can also be used to create the depth map in the same manner as the case of the point spread function (PSF), to thereby detect the subject movement distance. In the case of using the optical transfer function, only the amplitude components related to the movement of the subject are reflected and the phase components are removed, so that the detection accuracy for the positional displacement (movement in the xy direction) can further be improved.

That is, the digital camera of this embodiment includes: the CMOS image sensor 140 that captures an image of a subject formed through the optical system 110 including the focus lens, to generate image data; the DFD operation circuit 161 (an example of the distance measuring part) that uses the image data generated by the CMOS image sensor 140, to calculate a subject distance representing the distance to the subject and a movement distance (Δd) of the subject; and the controller 180 that uses the calculated subject distance or movement distance of the subject, to perform an auto-focus action. The DFD operation circuit 161 uses: first image data (the reference image B) generated by the image sensor 140 when the subject lies at a first position (P1); second image data (the observation image A) generated by the CMOS image sensor 140 at the same focus lens position and when the subject lies at a second position (P2); and the optical transfer function (OTF) of the optical system 110 corresponding to a focused position (L1) of the subject lying at the first position (P1), to find a distance (Δd) between the first position (P1) and the second position (P2). Based on the resultant distance, the DFD operation circuit 161 calculates the subject distance and the movement distance (Δd) of the subject for the image indicated by the second image data.

Other Embodiments

As above, the first embodiment has been described as a technical exemplification disclosed in this application. However, the technique of this disclosure is not limited thereto and could be applied to embodiments in which changes, permutations, additions, omissions, etc. have been properly made. By combining the constituent elements described in the above first embodiment, new embodiments may be created. Other embodiments will thus be exemplified.

(1) Although in the above embodiment, the point spread functions PSF for 16 movement distances Δd have been set correspondently to the combinations of the lens positions L and the subject distances D, the number of the movement distances is not limited thereto. Point spread functions PSF1 to PSFn may be set for a greater number (n) of or a less number of movement distances.

(2) The idea disclosed in the above embodiment can be applied to two types of digital cameras, i.e. an interchangeable lens camera and an integral lens camera.

(3) Although in the above embodiment, the digital camera has been used for description as an example of the imaging apparatus, the imaging apparatus is not limited thereto. The idea of this disclosure can be applied to various imaging apparatuses having the auto-focus function, such as the digital camera, a smartphone, and a wearable camera.

(4) Although in the above embodiment, the image sensor has been in the form of the CMOS image sensor, the image sensor is not limited thereto. The image sensor may be in the form a CCD or NMOS image sensor.

As above, the embodiment has been described as an exemplification of the technique in this disclosure. For that end, the accompanying drawings and the detailed description have been provided. Accordingly, the constituent elements described in the accompanying drawings and the detailed description may encompass not only essential constituent elements for solution of the problem but also unessential constituent elements for solving the problem to exemplify the above technique. For this reason, immediately from the fact that those unessential constituent elements have been described in the accompanying drawings and the detailed description, those unessential constituent elements should not be construed as being indispensable. Since the above embodiment is intended to exemplify the technique in this disclosure, various changes, permutations, additions, omissions, etc. could be made without departing from the scope of the claims and equivalence thereof.

This disclosure is applicable to an imaging apparatus capable of shooting a video. More specifically, it is applicable to various imaging apparatuses capable of shooting a video, such as the digital camera, smartphone, and wearable camera.

What is claimed is:

1. An imaging apparatus comprising:
an image sensor that captures an image of a subject formed via an optical system including a focus lens, to generate image data;
a distance measuring part configured to calculate a subject distance representing the distance to the subject and a movement distance of the subject by using the image data generated by the image sensor; and
a controller configured to perform an auto-focus action by using the calculated subject distance or movement distance of the subject,
wherein the distance measuring part using: first image data generated by the image sensor when the subject lies at a first position; second image data generated by the image sensor when the subject lies at a second position; and a point spread function of the optical system corresponding to a focused position of the subject lying at the first position, thereby finding a distance between the first position and the second position, and calculating the subject distance and the movement distance of the subject for an image indicated by the second image data based on the found distance.

2. The imaging apparatus according to claim 1, wherein the distance measuring part creates a map containing information indicative of a distance between the first position and the second position, for each of pixels of an image indicated by the second image data.

3. The imaging apparatus according to claim 1, further comprising: a lens driving unit that drives the focus lens, wherein the controller controls the lens driving unit, based on the calculated subject distance.

4. The imaging apparatus according to claim 3, wherein when detecting a movement of the subject in the direction of an optical axis, the controller controls the lens driving unit, based on the found movement distance of the subject.

5. An imaging apparatus comprising:
an image sensor that captures an image of a subject formed via an optical system including a focus lens, to generate image data;
a distance measuring part configured to calculate a subject distance representing the distance to the subject and a movement distance of the subject by using the image data generated by the image sensor; and
a controller configured to perform an auto-focus action by using the calculated subject distance or movement distance of the subject,
wherein the distance measuring part using: first image data generated by the image sensor when the subject lies at a first position; second image data generated by the image sensor when the subject lies at a second position; and an optical transfer function of the optical system corresponding to a focused position of the subject lying at the first position, thereby finding a distance between the first position and the second position, and calculating the subject distance and the movement distance of the subject for an image indicated by the second image data based on the found distance.

6. The imaging apparatus according to claim 5, wherein the distance measuring part creates a map containing information indicative of a distance between the first position and the second position, for each of pixels of an image indicated by the second image data.

7. The imaging apparatus according to claim 5, further comprising: a lens driving unit that drives the focus lens, wherein the controller controls the lens driving unit, based on the calculated subject distance.

8. The imaging apparatus according to claim 7, wherein when detecting a movement of the subject in the direction of an optical axis, the controller controls the lens driving unit, based on the found movement distance of the subject.

9. An imaging apparatus comprising:
an image sensor that captures an image of a subject formed via an optical system including a focus lens, to generate image data;
a distance measuring circuit configured to calculate a subject distance representing the distance to the subject and a movement distance of the subject by using the image data generated by the image sensor; and
a controller configured to perform an auto-focus action by using the calculated subject distance or movement distance of the subject,
wherein the distance measuring circuit uses; first image data generated by the image sensor when the subject lies at a first position; second image data generated by the image sensor when the subject lies at a second position; and a point spread function of the optical system corresponding to a focused position of the subject lying at the first position, thereby finding a distance between the first position and the second position, and calculating the subject distance and the movement distance of the subject for an image indicated by the second image data based on the found distance.

10. The imaging apparatus according to claim 9, wherein the distance measuring circuit creates a map containing information indicative of a distance between the first position and the second position, for each of pixels of an image indicated by the second image data.

11. The imaging apparatus according to claim 9, further comprising: a lens actuator that drive the focus lens, wherein the controller controls the lens actuator, based on the calculated subject distance.

12. The imaging apparatus according to claim 11, wherein when detecting a movement of the subject in the direction of an optical axis, the controller controls the lens actuator, based on the found movement distance of the subject.

13. An imaging apparatus comprising:
an image sensor that captures an image of a subject formed via an optical system including a focus lens, to generate image data;
a distance measuring circuit configured to calculate a subject distance representing the distance to the subject and a movement distance of the subject by using the image data generated by the image sensor; and
a controller configured to perform an auto-focus action by using the calculated subject distance or movement distance of the subject,
wherein the distance measuring circuit using: first image data generated by the image sensor when the subject lies at a first position; second image data generated by the image sensor when the subject lies at a second position; and an optical transfer function of the optical system corresponding to a focused position of the subject lying at the first position, thereby finding a distance and the movement distance of the subject for an image indicated by the second image data based on the found distance.

14. The imaging apparatus according to claim 13, wherein the distance measuring circuit creates a map containing information indicative of a distance between the first position and the second position, for each of pixels of an image indicated by the second image data.

15. The imaging apparatus according to claim 13, further comprising: a lens actuator that drives the focus lens, wherein the controller controls the lens actuator, based on the calculated subject distance.

16. The imaging apparatus according to claim 15, wherein when detecting a movement of the subject in the direction of an optical axis, the controller controls the lens driving unit, based on the found movement distance of the subject.

* * * * *